(12) United States Patent
Schene

(10) Patent No.: US 7,686,851 B2
(45) Date of Patent: Mar. 30, 2010

(54) CONCENTRATED DYE SOLUTIONS

(75) Inventor: Heidrun Schene, Efringen-Kirchen (DE)

(73) Assignee: Clariant Finance (BVI) Limited, Tortola (VG)

( * ) Notice: Subject to any disclaimer, the term of this patent is extended or adjusted under 35 U.S.C. 154(b) by 367 days.

(21) Appl. No.: 10/592,441

(22) PCT Filed: Mar. 4, 2005

(86) PCT No.: PCT/EP2005/050971

§ 371 (c)(1),
(2), (4) Date: Sep. 12, 2006

(87) PCT Pub. No.: WO2005/087872

PCT Pub. Date: Sep. 22, 2005

(65) Prior Publication Data

US 2007/0186805 A1  Aug. 16, 2007

(30) Foreign Application Priority Data

Mar. 12, 2004 (EP) .................................. 04005985

(51) Int. Cl.
*C09B 67/02* (2006.01)
(52) U.S. Cl. ...................... 8/527; 8/604; 8/684; 8/689; 8/691; 8/919
(58) Field of Classification Search .............. 8/527, 8/604, 684, 689, 691, 919
See application file for complete search history.

(56) References Cited

U.S. PATENT DOCUMENTS

| 4,995,885 | A | * | 2/1991 | Morawietz | ................ | 8/527 |
| 5,143,519 | A | | 9/1992 | Stingelin | | |
| 5,295,999 | A | | 3/1994 | Hinrichs et al. | | |
| 2006/0101595 | A1 | | 5/2006 | Hasemann | | |

FOREIGN PATENT DOCUMENTS

| EP | 0 369 940 A | 5/1990 |
| EP | 0 451 092 A | 10/1991 |
| EP | 0 553 672 A | 8/1993 |
| WO | WO 03/064539 A | 8/2003 |

OTHER PUBLICATIONS

STIC Search Report dated Dec. 3, 2008.*
PCT International Search Report for PCT/EP2005/050971, dated Jun. 17, 2005.
PCT International Preliminary Examination Report for PCT/EP2005/050971, dated Jul. 28, 2006.
New Chemical Materials Journal (Beijing PRC), No. 6 (vol. 29), 2001, pp. 37-38.

* cited by examiner

*Primary Examiner*—Eisa B Elhilo
(74) *Attorney, Agent, or Firm*—Tod A. Waldrop

(57) ABSTRACT

The present invention concerns concentrated storage-stable aqueous dye solutions comprising
a) 5% to 30% by weight of a dye of the formula

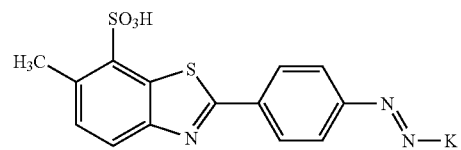

(1)

where K is a coupling component of the acetoacetanilide, pyridone, pyrazolone or pyrimidine series, and
b) 0.1 to 0.9 mol of aminoalkoxy alcohols or monoalkanolamines per mole of dye of the formula (1) and
c) 0 to 3 mol of trialkanolamine per mole of dye of the formula (1).

15 Claims, No Drawings

CONCENTRATED DYE SOLUTIONS

The present invention concerns concentrated storage-stable aqueous dye solutions, especially concentrated storage-stable aqueous dye solutions comprising benzothiazole dye derivatives. The present invention further concerns the use of the present invention's concentrated dye solutions, if appropriate after dilution with water, especially for dyeing and printing paper, including card and board.

Dye solutions should have optimal stability, so that they do not precipitate during transportation or in storage. Typically, they should be stable for a prolonged period between 0 and 5 degrees Celsius, but also at around 50° C. Similarly, frozen solutions shall be stable after thawing and should not present any stability problems during pumping. Solutions containing precipitates can cause disruptions in pumping or metering systems and lead to unacceptable machine shutdowns and costly cleaning and maintenance.

Concentrated aqueous dye solutions are known. EP0369940A2 discloses aqueous dye solutions comprising 7% to 30% by weight of a benzothiazole dye derivative together with 1 to 5 mol of a specific amine per mole of dye and also 10-25% by weight of an organic solubilizer. WO03064539A1 discloses aqueous dye solutions comprising 5% to 30% by weight of a dye based on a benzothiazole derivative together with 0.05-5% of one or more additional, aromatic heterocycles (an additional benzothiazole derivative for example) and 1-5 mol of a base or of a mixture of bases per mole of dye. To produce the stable dye solutions, in both cases the free dyeacids are isolated and stirred up with mixtures of water, standardizers and solubilizers.

One problem of known aqueous dye solutions is the large amounts of added solubilizers, which lead to a high carbon content level in the dyehouse or paper mill effluents. This leads to effluents of high total organic carbon (TOC) and chemical oxygen demand (COD), and hence causes high water-treating costs. It is accordingly an object of the present invention to provide concentrated storage-stable aqueous dye solutions where the dyes do not have to be isolated as free acids, which are free of additional solubilizing aromatic heterocycles and which include little by way of additional solubilizers.

It has now been found that concentrated aqueous dye solutions comprising aminoalkoxy alcohols or monoalkanolamines as standardizers together with any trialkanolamines are stable in storage even when the dye is not isolated as a free acid, no additional, aromatic heterocycles are added for solubilization and the standardizer is present in distinctly lower concentrations than in the prior art.

The present invention provides concentrated storage-stable aqueous dye solutions comprising
 a) 5% to 30% by weight of a dye of the formula

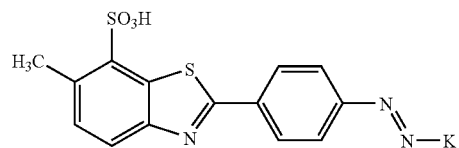

(1)

where K is a coupling component of the acetoacetanilide, pyridone, pyrazolone or pyrimidine series, and
 b) 0.1 to 0.9 mol of aminoalkoxy alcohols or monoalkanolamines per mole of dye of the formula (1) and
 c) 0 to 3 mol of trialkanolamine per mole of dye of the formula (1).

The present invention's concentrated storage-stable aqueous dye solutions, apart from the identified components a), b) and c) and optionally a biocide, include no further additives.

Preferably, the dye solutions of the present invention comprise 5% to 25% by weight of a dye of the formula (1). More preferably, the dye solutions of the present invention include 7% to 20% by weight of a dye of the formula (1).

Preferred aminoalkoxy alcohols are amines of the formula NR'R''R''' where R', R'' and R''' are identically or independently H, methyl-, ethyl-, propyl-, butyl-, pentyl-, hexyl- or $-((CH_2)_nO)_m-(CH_2)_nOH$ where at least one of R', R'' and R''' is $-((CH_2)_nO)_m-(CH_2)_nOH$, with n=2, 3 or 4 or m=an integer from 1 to 20. By preference R', R'' and R''' are identically or independently H, or $-((CH_2)_nO)_m-(CH_2)_nOH$ where at least one of R', R'' and R''' is $-((CH_2)_nO)_m-(CH_2)_n OH$, with n=2, 3 or 4 or m=an integer from 1 to 20. Preferably, n is =2 and m is =1 to 4 and more preferably m is =1.

Preferred monoalkanolamines are amines of the formula NR'R''R''' where R' hydroxyethyl-, hydroxypropyl-, hydroxybutyl-, hydroxypentyl- or hydroxyhexyl- and R' and R''' is methyl-, ethyl-, propyl-, butyl-, pentyl-, hexyl- or R'' and R''' form together a five to six membered ring which may be interrupted by an heteroatom selected from O or N.

Particularly preferred aminoalkoxy alcohols/monoalkanolamines are 3-dimethylamino-1-propanol or 2-(2-aminoethoxy)ethanol or N-(2-hydroxyethyl)piperazine. 2-(2-Aminoethoxy)ethanol is particularly preferred.

Preferred bases/trialkanolamines are trialkanolamines comprising $C_2$ to $C_4$ alkanol radicals. Triethanolamine is particularly preferred.

The sulpho group or groups in the dye molecule (1) can be deprotonated or be present as $-SO_3M$ salts, which are mostly dissociated in solution. In principle all colourless cations can be used as M cations. Examples of such M cations are ammonium cations or substituted ammonium cations, examples being mono-, di-, tri- and tetramethylammonium, triethylammonium and mono-, di- and triethanolammonium. Substituted ammonium cations are preferred and triethanolammonium is most preferred.

In a preferred embodiment, the storage-stable solutions of the present invention are free of lithium ions and low in other alkali metal cations, examples being sodium and potassium ions. More particularly, the solutions are low in sodium ions, meaning that the concentration of these ions is below 0.05%, but preferably below 0.03%.

Preferably, K is a coupling component of the formula (2)

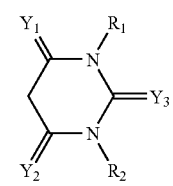

(2)

where
 $Y_1$ and $Y_2$ are independently =O, =NH or =N—$C_{1-4}$-alkyl,
 $Y_3$ is =O, =S, =NR or =N—CN, where R is either H or $C_{1-4}$-alkyl, and
 $R_1$ and $R_2$ are independently H, unsubstituted alkyl, unsubstituted phenyl, substituted alkyl or substituted phenyl.

The above formula (2) is shown as indicated only in one tautomeric form for the coupling component K; however, the other tautomeric forms shall be comprehended by this formula as well.

When $R_1$ and/or $R_2$ represent a substituted or unsubstituted alkyl group, this is to be understood as meaning for example a methyl, ethyl, n-propyl, isopropyl, n-, sec- or tert-butyl, a straight-chain or branched pentyl or hexyl or a cyclohexyl radical which may be singly or multiply substituted, for example by —OH, $C_{1-4}$-alkoxy or $C_{1-4}$-hydroxyalkoxy.

Examples of suitable substituted alkyl radicals are: methoxymethyl, ethoxymethyl, ethoxyethyl, ethoxypropyl, n-propoxymethyl, isopropoxymethyl, butoxymethyl, butoxyethyl, butoxypropyl, methoxybutyl, ethoxypentyl and 2-hydroxyethoxypentyl.

When $R_1$ and/or $R_2$ represent optionally substituted phenyl, this is to be understood as meaning unsubstituted phenyl or phenyl substituted by one or more identical or different radicals.

Such radicals include for example: $C_{1-4}$-alkyl (herein to be understood as meaning generally methyl, ethyl, n-propyl, isopropyl or n-, sec- or tert-butyl), $C_{1-4}$-alkoxy (herein to be understood as meaning generally methoxy, ethoxy, n-propoxy, isopropoxy or n-, sec- or tert-butoxy), halogen such as fluorine, chlorine or bromine or nitro.

Preferably, $R_1$ and/or $R_2$ in the meaning of phenyl are unsubstituted phenyl or phenyl substituted by 1 to 3 $C_{1-4}$-alkyl, chlorine or methoxy groups, especially the meaning of unsubstituted phenyl being preferred.

$R_1$ and $R_2$ are each preferably hydrogen or $C_{1-4}$-alkyl and more preferably hydrogen or methyl.

$Y_1$ and/or $Y_2$ are each preferably the functional group =O or =NH, in which case it is also preferable that $Y_1$ and $Y_2$ be the same. It is particularly preferable for $Y_1$ and $Y_2$ to be the same and each to be =O.

$Y_3$ is preferably =O, =S, =Ni or =N—CN and more preferably =O and =N—CN.

In a particularly preferred embodiment, the dye solutions of the present invention comprise azo dyes of the formula (1) where $R_1$ and $R_2$ are independently hydrogen or $C_{1-4}$-alkyl, $Y_1$ and $Y_2$ are independently =O or =NH and $Y_3$ is =O, =S, =NH or =N—CN. Very particular preference is given to the use of barbituric acid and 2-cyanimino-4,6-dihydroxypyrimidine as coupling components K.

The dyes of the formula (1) are known or are obtained in a known manner.

The aqueous dye solutions of the present invention include not more than 0.9 mol of amine per mole of dye of the formula (1) selected from the group consisting of 2-(2-diethylaminoethoxy)ethanol, N-(2-hydroxyethyl)piperazine, 2-(2-aminoethoxy)ethanol or 3-dimethylamino-1-propanol. Preferably, the dye solutions include 0.2 to 0.9 mol, preferably 0.3 to 0.9 mole, selected from the group consisting of 2-(2-diethylaminoethoxy)ethanol, N-(2-hydroxyethyl)piperazine, 2-(2-aminoethoxy)ethanol or 3-dimethylamino-1-propanol per mole of dye. Of the amines mentioned, 3-dimethylamino-1-propanol, 2-(2-aminoethoxy)ethanol and N-(2-hydroxyethyl)piperazine are particularly preferred, of which 2-(2-aminoethoxy)ethanol is even more preferred.

The aqueous dye solutions of the present invention preferably comprise
a) 5% to 30% by weight, preferably 7% to 20% by weight, of a dye of the formula (1),
b) 0.1 to 0.9 mol, preferably 0.3 to 0.9 mol, of 2-(2-aminoethoxy)ethanol, 3-dimethylamino-1-propanol or N-(2-hydroxyethyl)piperazine per mole of dye of the formula (1) and also
c) 0 to 3 mol, preferably 0.5 to 2.6 mol, of trialkanolamine per mole of dye of the formula (1).

Of these, particular preference is given to those comprising
a) 7% to 20% by weight of a dye of the formula (1),
b) 0.4 to 0.9 mol of 2-(2-aminoethoxy)ethanol, 3-dimethylamino-1-propanol or N-(2-hydroxyethyl)piperazine per mole of dye of the formula (1) and also
c) 0.8 to 2.5 mol of trialkanolamine per mole of dye of the formula (1).

The dye solutions of the present invention may comprise biocides in addition to the water-soluble organic bases mentioned.

Any biocide is suitable. Preference is given to using biocides having FDA approval. Any biocide capable of controlling the growth of Gram-positive or Gram-negative bacteria, yeasts or fungi can be used in the solutions of the present invention. Suitable biocides are for example 3-thiazolone derivatives, for example alkylated and/or chlorinated 3-thiazolone derivatives, or mixtures thereof. Typically, the biocides are added in an amount of up to 0.15% by weight (per ready-produced composition).

The concentrated aqueous dye solutions of the present invention are generally produced by adding the organic base (especially trialkanolamine or solutions of trialkanolamine) during the coupling of diazotized 2-(4-aminophenyl)-6-methylbenzothiazole-7-sulphonic acid onto the coupling components HK and adding the above-identified amount of aminoalkoxy alcohol or monoalkanolamine to the dye solution after the reaction has ended.

Alternatively, the concentrated aqueous dye solutions of the present invention are generally produced by adding the organic base (especially trialkanolamine or solutions of trialkanolamine) to the coupling components HK and then the diazotized 2-(4-aminophenyl)-6-methylbenzothiazole-7-sulphonic acid is added and the above identified amount of aminoalkoxy alcohol or monoalkanolamine is added to the dye solution after the reaction has ended.

If necessary, the dye solution is subsequently filtered and adjusted to on-spec strength. The concentrated aqueous dye solutions obtained are notable in particular for good stability in storage.

The dye solution of the present invention can alternatively be produced by 2-(4-aminophenyl)-6-methylbenzothiazole-7-sulphonic acid being conventionally diazotized and used in the coupling reaction without isolation. The neutralization during coupling is effected by means of organic or inorganic bases. The salts formed are subsequently removed by ultrafiltration at elevated temperature (at temperatures above room temperature, i.e. above 20° C., especially above 25° C., preferably between 30° C. and 70° C.) with addition of trialkanolammonium salt or solutions of trialkanolammonium salt. Thereafter, the above-identified ratios of trialkanolamine and aminoalkoxy alcohol or monoalkanolamine are set. The concentrated aqueous dye solutions thus obtained are similarly notable for good stability in storage in particular.

Diazotization and coupling are carried out in conventional manner. To this end, 2-(4-aminophenyl)-6-methylbenzothiazole-7-sulphonic acid is diazotized at 0° C. to 20° C. and at a pH between 0 and 5, preferably at a pH between 0 to 4, using sodium nitrite in an aqueous solution rendered acidic with hydrochloric acid. To couple with the coupling component, the reaction solution or suspension is adjusted with organic or inorganic base, preferably with trialkanolamine or solutions of trialkanolamine, preferably with triethanolamine, to a pH in the range from 3 to 7 and preferably to a pH in the range from 4.5 to 6.5 and the temperature during the coupling reaction is held between 0° C. and 70° C. and preferably between 20° C. and 55° C.

A preferred process for producing concentrated storage-stable aqueous dye solutions according to the invention is characterized in that the 0 to 3 mol of trialkanolamine per mole of the resulting dye of the formula (1) is added during the coupling of diazotized 2-(4-aminophenyl)-6-methylbenzothiazole-7-sulphonic acid onto the coupling component HK and the 0.1 to 0.9 mol of aminoalkoxy alcohols or monoalkanolamines per mole of the resulting dye of the formula (1) is added to the dye solution after the reaction has ended.

A further preferred process for producing concentrated storage-stable aqueous dye solutions according to the invention is characterized in that the 0 to 3 mol of trialkanolamine per mole of the resulting dye of the formula (1) is mixed with the coupling component HK and the diazotized 2-(4-aminophenyl)-6-methylbenzothiazole-7-sulphonic acid is added and the 0.1 to 0.9 mol of aminoalkoxy alcohols or monoalkanolamines per mole of the resulting dye of the formula (1) is added to the dye solution after the reaction has ended.

The process for producing concentrated storage-stable aqueous dye solutions according to the invention is in a preferred embodiment characterized in that the diazotized 2-(4-aminophenyl)-6-methylbenzothiazole-7-sulphonic acid is used in the coupling reaction without being isolated and the neutralization is effected during the coupling by organic or inorganic bases and subsequently the salts formed are removed by ultrafiltration with addition of trialkanolammonium salts or solutions thereof and thereafter the amount of amines which is identified above is added to the dye solution.

The concentrated dye solutions of the present invention are used, if appropriate after dilution with water, especially for dyeing leather and dyeing and printing paper, including card and board, these materials being dyeable for example in the pulp, by coating or by dipping. Besides, a liquid formulation of this kind can also be used for a continuous or batch dyeing process for textile materials, especially cellulose. The concentrated dye solutions of the present invention can be used as a basis for producing inkjet inks or other inks and formulations for contactless printing of substrates such as paper or textiles. Even without further modification, the formulations of the present invention can be used directly for the contactless printing of substrates such as paper or textiles.

The present invention further provides for the use of the present invention's dye preparations of anionic dyes for producing wood stains for staining solid wood or wood chippings or chipboards or wood fibre boards. Staining wood in form of beams, boards or finished objects like furniture, parts of buildings is a preferred use of the wood stains according to the invention. The application of the liquid formulations according to the invention may be carried out over the whole or part of the wood's surface (to compensate for color defects in the wood or veneer). The liquid formulations according to the invention may be used in water stains (main solvent water), solvent stains (ca. 30-95% organic solvent), or chemical stains (which are generally water thinnable).

The examples which follow illustrate the invention. All parts are parts per weight and % are weight-%, if not indicated differently.

EXAMPLE 1

160 g of 2-(4-aminophenyl)-6-methylbenzothiazole-7-sulphonic acid are dissolved in dilute aqueous sodium hydroxide solution, prepared from 1500 g of water and 75 g of 30% caustic soda, and admixed with 36.3 g of sodium nitrite. This solution is metered into a mixture of 125 g of ice and 172.5 g of 30% hydrochloric acid and diazotized. The resulting suspension is filtered and the presscake washed with dilute hydrochloric acid.

Subsequently, 62.8 g of barbituric acid and the diazo presscake are introduced into 875 g of deionized water and stirred up therein. The pH of the suspension is by a dropwise addition of 82 g of triethanolamine adjusted to 5-6 and maintained during coupling.

During coupling, the internal temperature is between 20 and 35° C. After the reaction has ended, the dye solution is admixed with 33.3 g (0.32 mol) of 2-(2-aminoethoxy)ethanol and 2.5 g of Proxel™ GXL (Proxel is a trade mark of Zeneca AG Products, Inc. and comprises 1,2-benzisothiazolin-3-one (CAS No.: 2634-33-5)) and diluted with deionized water to 1662.5 g. A sample of the solution thus obtained was stable even after two weeks of storage at 0° C. and thawing in that it neither separated nor developed streaks. Similarly, the sample stored for two weeks at 50° C. and cooled down to room temperature was observed neither to separate nor to develop streaks.

EXAMPLE 2

A dye solution of similar quality to Example 1 is obtained on dissolving 62.8 g of barbituric acid in 875 g of water and 82 g of triethanolamine and then adding the diazo presscake of Example 1 a little at a time.

EXAMPLE 3

Example 1 is repeated to diazotize 32 g of dehydrothiotoluidine monosulphonic acid (=2-(4-aminophenyl)-6-methylbenzothiazole-7-sulphonic acid) and isolate the diazotization product. At room temperature, 15.5 g of 2-cyanimino-4,6-dihydroxypyrimidine are suspended/dissolved in 25 g of water and 34.7 g of triethanolamine. Then the diazo presscake is added and the reaction mixture is diluted with a further 150 g of water. After coupling has ended, the dye solution is clarified, admixed with 8.4 g (0.08 mol) of 2-(2-aminoethoxy)ethanol and 0.7 g of Proxel™ GXL and diluted with deionized water to 465 g.

EXAMPLE 4

Example 1 is repeated including coupling on barbituric acid. After the reaction has ended, the dye solution is admixed with 33.3 g (0.26 mol) of N-(2-hydroxyethyl)piperazine and 2.5 g of Proxel™ GXL (Proxel is a trade mark of Zeneca AG Products, Inc. and comprises 1,2-benzisothiazolin-3-one (CAS No.: 2634-33-5)) and diluted with deionized water to 1662.5 g. A sample of the solution thus obtained was stable even after two weeks of storage at 0° C. and thawing in that it neither separated nor developed streaks. Similarly, the sample stored for two weeks at 50° C. and cooled down to room temperature was observed neither to separate nor to develop streaks.

EXAMPLE 5

Example 4 is repeated and N-(2-hydroxyethyl)piperazine is substituted by 33.3 g (0.32 mol) of 3-dimethylamino-1-propanol. Under the same test conditions the resulting dye solution shows the same good stability than mentioned above.

EXAMPLE 6

Substitution of N-(2-hydroxyethyl)piperazine in Example 4 by 33.3 g (0.21 mol) of 2-(2-diethylaminoethoxy)ethanol led also to a dye solution with similar stability than mentioned above.

EXAMPLE 7

The diazotization of 2-(4-aminophenyl)-6-methylbenzothiazole-7-sulphonic acid is carried out similarly to Example 1. For further reaction, the diazo suspension is admixed with 62.8 g of barbituric acid and adjusted to pH 3.5 with 30% caustic soda. The pH is maintained during the coupling reaction.

The dye suspension is subsequently heated to 50° C. and adjusted to pH 6 by metered addition of triethanolamine. A laboratory ultrafiltration range equipped with a DL5 membrane (wound module, membrane area 0.55 m$^2$) is initially operated at 12 bar and 46-48° C. to concentrate by 500 g and then in diafiltration mode until the conductivity of the permeate is <1 mS/cm and the level of alkali metal ions in the retentate is <300 ppm. If appropriate, a solution of triethanolammonium hydrochloride, prepared from 41.6 g of triethanolamine, 73.6 g of water and 32.1 g of 30% hydrochloric acid, is added during the diafiltration. The retentate is subsequently concentrated by a further 400 g and the level of dye and amino alcohols is checked and adjusted to the ratios identified in Example 1. To this end, initially the triethanolamine is supplemented and thereafter 33.3 g of 2-(2-aminoethoxy)ethanol and 2.5 g of Proxel™ GXL are added. The dye solution is diluted with deionized water to 1662.5 g.

Under the same test conditions (carried out concurrently), the same, good stabilities were observed.

EXAMPLE 8

160 g of 2-(4-aminophenyl)-6-methylbenzothiazole-7-sulphonic acid are suspended in 1500 g of hot water at 50° C. and dissolved with 107.6 g of triethanolamine. Diazotization is subsequently carried out similarly to Example 1. For further reaction, the diazatous suspension is admixed with 62.8 g of barbituric acid and adjusted to a pH 5.5 with triethanolamine. The pH is maintained during the coupling reaction, a total of 134.1 g of triethanolamine being consumed for this.

A laboratory ultrafiltration range equipped with a DL5 membrane (wound module, membrane area 0.55 m$^2$) is initially operated at 20 bar and 46-48° C. to concentrate by 500 g and then in diafiltration mode until the conductivity of the permeate is <1 mS/cm and the level of alkali metal ions in the retentate is <300 ppm. If appropriate, a solution of triethanolammonium hydrochloride, prepared from 131 g of triethanolamine, 208 g of water and 90 g of 30% hydrochloric acid, is added during the diafiltration. The retentate is subsequently concentrated by a further 700 g and the level of dye and amino alcohols is checked and adjusted to the ratios identified in Example 1. To this end, initially the triethanolamine is supplemented and thereafter 33.3 g of 2-(2-aminoethoxy)ethanol and 2.5 g of Proxel™ GXL are added. The dye solution is diluted with deionized water to 1662.5 g.

Under the same test conditions (carried out concurrently), the same, good stabilities were observed.

COMPARATIVE EXAMPLE A

Substitution of N-(2-hydroxyethyl)piperazine in Example 4 by 53.4 g (0.41 mol) of 3-diethylamino-1-propylamine (0.9 mol amine per mol of the dyestuff) led to a precipitation of the dyestuff. This paste couldn't be solved again not even by heating.

COMPARATIVE EXAMPLE B

Substitution of N-(2-hydroxyethyl)piperazine in example 4 by 43.1 g (0.41 mol) of diethanolamine led to an unstable solution forming precipitates after storing at +50° C. and cooling down to room temperature.

Examples 1 to 8 were repeated without, however, biocide being added; that is, no Proxel™ GXL was added. Under the same test conditions (carried out concurrently), the same, good stabilities were observed.

Dyeing Prescriptions

Dyeing Prescription A 70 parts of chemically bleached pinewood sulphite cellulose and 30 parts of chemically bleached birchwood sulphite cellulose are beaten into 2000 parts of water in a hollander. 1.5 parts of the liquid dye preparation of Example 1 are added to this stuff. Paper is made therefrom after a mixing time of 20 minutes. The absorbent paper obtained in this way has a yellow colour.

Dyeing Prescription B 1.5 parts of the liquid dye preparation of Example 1 are added to 100 parts of chemically bleached sulphite cellulose beaten with 2000 parts of water in a hollander. After mixing through for 15 minutes, customary sizing is effected using resin size and aluminium sulphate. Paper made from this material exhibits a yellow hue in each case.

Dyeing Prescription C

An absorbent web of unsized paper is pulled at 40-50° C. through an aqueous dye solution consisting of 95 parts of water and 5 parts of the inventive dye solution of Example 1.

Excess dye solution is squeezed by two rolls. The dried web of paper has a yellow colour in each case.

Dyeing Prescription D 15 kg waste paper (wood based), 25 kg bleached ground wood and 10 kg not bleached sulphite cellulose were mixed with water and beaten until a 3% aqueous suspension was obtained. This suspension was diluted to a 2% aqueous suspension. Under continuously stirring 5% Kaolin (china clay; based on the dry fibre content of the suspension) and 1.25 kg of a to 5% diluted dyestuff preparation from example 1 were added.

After 20 minutes 1% of a resin-glue dispersion (based on the dry fibre content) was added. The homogenous suspension was brought to pH 5 by adding alum shortly before the paper suspension was transferred to the paper machine. Following this procedure a yellow paper was produced.

The dye preparations of Examples 2 to 8 can be used for dyeing similarly to prescriptions A to D.

Dyeing Prescription E 2.5 parts of the dye preparation of example 1 are dissolved at 60° C. in 100 parts of demineralized water and subsequently diluted with 900 parts of cold, demineralized water. Then 100 parts of cotton tricot (bleached) are introduced into the bath. After 5 minutes, 10 parts of calcined sodium sulfate are added. During 35 minutes, the temperature of the dye bath is continuously raised to 95° C. This temperature is maintained for 60 minutes and the dye bath is then cooled to 70° C. over the course of 30 minutes. The dyeing is then removed from the liquor, rinsed with water and dried. The dyeing obtained has a yellow colour.

The dye preparations of Examples 2-8 can be used for dyeing cotton in a similar manner.

Dyeing Prescription F 100 parts of cotton tricot, which have been dyed with the dyestuff of example 1 analogously to the method of example E in about 1/1 standard depth, are mixed without intermediate drying in 1000 parts of tap water at 25° C. with 5 parts of sodium chloride and 4 parts of an after-treatment agent obtained from the reaction of diethylenetriamine with dicyandiamide. The pH value of the dye bath is set at 6.5-7. The bath is heated to 40° C. over the course of 20 minutes, and this temperature is maintained for further 20 minutes. Afterwards, the material is rinsed with cold tap water. The yellow cotton which has been after-treated in this way has an improved washing fastness.

Dyeing can be done in a similar manner with the dyes of Examples 2-8.

Dyeing Prescription G 100 parts of crusted chrome grain leather are pretreated at 50° C. in 800 parts water, 2 parts ammonia and 0.3 parts wetting agent for 90 minutes. In another float consisting of 400 parts of water, 2 parts ammonia (25% aq. solution), 2 parts anionic fat liquor based on sulphonated fish oil and 1 part penetration aid this leather was drummed for 15 minutes at 50° C. At the same temperature 6 parts of the dye preparation made according to example 1 are added and the leather was treated for further 60 minutes. Afterwards 3 parts formic acid, diluted with 60 parts water, were added and the leather was treated for further 20 minutes. Conventional procedures were used for subsequent finishing, washing and drying.

The leather obtained has a level yellow hue.

Further low-affinity, vegetable-retanned leathers can likewise be dyed according to known methods.

Dyeing can be done in a similar manner with the dyes of examples 2-8.

Dyeing Prescription H

A batten of coniferous wood (European spruce) and a batten of leafy wood (beech) were each cut into pieces of about 5 cm and immersed for some minutes in a diluted (10 parts water and 1 part of the dye solution according to example 1) dyestuff solution according to example 1 and after drying for ten hours light yellowish batten pieces were obtained.

Dyeing can be done in a similar manner with the dyes of Examples 2-8.

The invention claimed is:

1. A concentrated storage-stable aqueous dye solution comprising
    a) 7% to 20% by weight of a dye of the formula

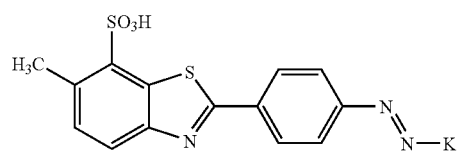

(1)

wherein K is a coupling component of the formula (2)

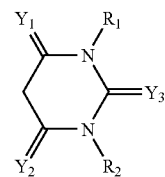

(2)

wherein
    $Y_1$ and $Y_2$ are =O,
    $Y_3$ is =O or =N—CN, and
    $R_1$ and $R_2$ are H,
    b) 0.4 to 0.9 mol of 2-(2-aminoethoxy)ethanol, 3-dimethylamino-1-propanol or N-(2-hydroxyethyl)piperazine per mole of the dye of the formula (1) and
    c) 0.8 to 2.5 mol of at least one trialkanolamine per mole of the dye of the formula (1).

2. A concentrated storage-stable aqueous dye solution according to claim 1, wherein the at least one trialkanolamine comrwises a $C_2$ to $C_4$ alkanol radical.

3. A process for producing a concentrated storage-stable aqueous dye solution according to claim 1, comprising the steps of adding the organic base during the coupling of diazotized 2-(4-aminophenyl)-6-methylbenzothiazole-7-sulphonic acid onto the coupling components HK to form a dye solution and adding the 0.4 to 0.9 mol of the at least one aminoalkoxy alcohol or monoalkanolamine per mole of dye of the formula (1) to the dye solution after the reaction has ended.

4. A process for producing a concentrated storage-stable aqueous dye solution according to claim 1, comprising the steps of adding the organic base to the coupling components HK followed by the diazotized 2-(4-aminophenyl)-6-methylbenzothiazole-7-sulphonic acid to form a dye solution and adding the 0.4 to 0.9 mol of the at least one aminoalkoxy alcohol or monoalkanolamine per mole of dye of the formula (1) to the dye solution after the reaction has ended.

5. A process for producing a concentrated storage-stable aqueous dye solution according to claim 1, comprising the steps of neutralizing the diazotized 2-(4-aminophenyl)-6-methylbenzothiazole-7-sulphonic acid with an organic or inorganic base in the coupling reaction without isolation, subsequently removing any unwanted salts formed during the neutralizing step by ultrafiltration, adding at least one trialkanolammonium salt or solution thereof and thereafter adding the 0.4 to 0.9 mol of the at least one aminoalkoxy alcohol or monoalkanolamine per mole of dye of the formula (1).

6. A process for dyeing or printing leather or cellulosic material comprising the step of contacting the leather or cellulosic material with the concentrated storage-stable aqueous dye solution according to claim 1.

7. A contactless printing ink or formulation comprising the concentrated storage-stable aqueous dye solution according to claim 1.

8. A substrate dyed or printed with a concentrated storage-stable aqueous dye solution according to claim 1.

9. A process for dyeing or printing paper, wood or cardboard comprising the step of contacting the paper, wood or cardboard with the concentrated storage-stable aqueous dye solution according to claim 1.

10. A process for dyeing and printing paper, wood or cardboard comprising the step of contacting the paper, wood or cardboard with the concentrated storage-stable aqueous dye solution according to claim 1.

11. A process for dyeing and printing leather or cellulosic material comprising the step of contacting the leather or cellulosic material with the concentrated storage-stable aqueous dye solution according to claim 1.

12. A substrate dyed and printed with a concentrated storage-stable aqueous dye solution according to claim 1.

13. An ink or formulation for inkjet printing comprising the concentrated storage-stable aqueous dye solution according to claim 1.

14. A dyed or printed paper, wood or cardboard made in accordance with the process according to claim 9.

15. A dyed and printed paper, wood or cardboard made in accordance with the process according to claim 10.

* * * * *